United States Patent
Ohyama et al.

(10) Patent No.: US 10,305,099 B2
(45) Date of Patent: May 28, 2019

(54) ELECTRODE ALLOY POWDER, NEGATIVE ELECTRODE FOR NICKEL-METAL HYDRIDE STORAGE BATTERIES USING THE SAME, AND NICKEL-METAL HYDRIDE STORAGE BATTERY

(71) Applicant: PANASONIC INTELLECTUAL PROPERTY MANAGEMENT CO., LTD., Osaka (JP)

(72) Inventors: Hideaki Ohyama, Osaka (JP); Akiko Okabe, Osaka (JP); Fumio Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 15/031,650

(22) PCT Filed: Oct. 7, 2014

(86) PCT No.: PCT/JP2014/005094
§ 371 (c)(1),
(2) Date: Apr. 22, 2016

(87) PCT Pub. No.: WO2015/068331
PCT Pub. Date: May 14, 2015

(65) Prior Publication Data
US 2016/0276661 A1    Sep. 22, 2016

(30) Foreign Application Priority Data

Nov. 8, 2013 (JP) .................................. 2013-232501

(51) Int. Cl.
*H01M 10/24* (2006.01)
*H01M 4/38* (2006.01)
(Continued)

(52) U.S. Cl.
CPC .......... *H01M 4/385* (2013.01); *B22F 1/0003* (2013.01); *H01M 2/14* (2013.01); *H01M 4/242* (2013.01);
(Continued)

(58) Field of Classification Search
CPC ........ H01M 4/38; H01M 10/24; H01M 10/28; H01M 2/14; H01M 4/24; H01M 4/36;
(Continued)

(56) References Cited

U.S. PATENT DOCUMENTS 5,654,115 A *  8/1997  Hasebe ................. B22F 1/0055
                                                              420/900
6,030,725 A     2/2000  Moriwaki et al.
(Continued)

FOREIGN PATENT DOCUMENTS

JP    H04-162355 A    6/1992
JP    H05-062676 A    3/1993
(Continued)

OTHER PUBLICATIONS

JP H11-181536MT.*
(Continued)

*Primary Examiner* — Alexander Usyatinsky
(74) *Attorney, Agent, or Firm* — McDermott Will & Emery LLP (57) ABSTRACT

Provided is an electrode alloy powder that is useful to obtain a nickel-metal hydride storage battery having a high battery capacity and a reduced self-discharge. The alloy powder is: a mixture including particles of a first hydrogen storage alloy having an $AB_5$-type crystal structure, and particles of at least one second hydrogen storage alloy selected from the group consisting of a hydrogen storage alloy a having an $AB_2$-type crystal structure and a hydrogen storage alloy b having an $AB_3$-type crystal structure, wherein an amount of (Continued)

the first hydrogen storage alloy included in the mixture is greater than 50 mass %.

8 Claims, 1 Drawing Sheet

(51) Int. Cl.
    *H01M 4/36*     (2006.01)
    *B22F 1/00*     (2006.01)
    *H01M 2/14*     (2006.01)
    *H01M 4/24*     (2006.01)
    *H01M 10/28*     (2006.01)
    *H01M 10/34*     (2006.01)
    *H01M 4/02*     (2006.01)

(52) U.S. Cl.
    CPC ........... *H01M 4/364* (2013.01); *H01M 4/381* (2013.01); *H01M 4/383* (2013.01); *H01M 10/24* (2013.01); *H01M 10/286* (2013.01); *H01M 10/345* (2013.01); *H01M 2004/027* (2013.01); *Y02E 60/124* (2013.01)

(58) Field of Classification Search
    CPC ...... H01M 4/364; H01M 4/383; H01M 4/385; H01M 4/242; H01M 4/381; H01M 10/286; H01M 10/345; H01M 2004/027; B22F 1/0003; Y02E 60/124
    See application file for complete search history.

(56) References Cited

U.S. PATENT DOCUMENTS

| | | | | |
|---|---|---|---|---|
| 6,066,415 A * | 5/2000 | Sakai | .................. | C01B 3/0031 420/900 |
| 2006/0024581 A1 | 2/2006 | Kihara | | |
| 2007/0141464 A1 * | 6/2007 | Huang | .................. | H01M 4/12 429/218.2 |
| 2007/0269717 A1 * | 11/2007 | Bandou | ................. | C01B 3/0057 429/218.2 |
| 2008/0145719 A1 * | 6/2008 | Yang | ................... | H01M 4/9083 429/410 |
| 2011/0229755 A1 * | 9/2011 | Sugii | .................... | H01M 4/383 429/163 |
| 2013/0084474 A1 * | 4/2013 | Mills | .................. | H01M 4/9016 429/9 |
| 2014/0374652 A1 * | 12/2014 | Young | .................. | H01M 4/383 252/182.1 |

FOREIGN PATENT DOCUMENTS

| | | |
|---|---|---|
| JP | H07-278708 A | 10/1995 |
| JP | H10-326613 A | 12/1998 |
| JP | H11-003705 A | 1/1999 |
| JP | H11-181536 A | 7/1999 |
| JP | 2006-040847 A | 2/2006 |
| JP | 2012-156101 A | 8/2012 |

OTHER PUBLICATIONS

JP H10-326613cl.*
Decision to Grant a Patent issued by JPO dated May 9, 2017 (Year: 2017).*
Notification to Grant issued by SIPO dated Jun. 7, 2018 (Year: 2018).*
Inntemational Search Report and Written Opinion issued in corresponding International Patent and Trademark Office, dated Dec. 2, 2014; with partial English translation.

* cited by examiner

ELECTRODE ALLOY POWDER, NEGATIVE ELECTRODE FOR NICKEL-METAL HYDRIDE STORAGE BATTERIES USING THE SAME, AND NICKEL-METAL HYDRIDE STORAGE BATTERY

RELATED APPLICATIONS

This application is the U.S. National Phase under 35 U.S.C. § 371 of International Patent Application No. PCT/JP2014/005094, filed on Oct. 7, 2014, which in turn claims the benefit of Japanese Application No. 2013-232501, filed on Nov. 8, 2013, the disclosures of which Applications are incorporated by reference herein.

TECHNICAL FIELD

The present invention relates to an electrode alloy powder, a negative electrode for nickel-metal hydride storage batteries using the same, and a nickel-metal hydride storage battery, and more particularly relates to an improvement of an electrode alloy powder using a hydrogen storage alloy.

BACKGROUND ART

An alkaline storage battery that uses a negative electrode containing a hydrogen storage alloy as a negative electrode active material exhibits excellent output characteristics and also has high durability (e.g., superior life characteristics and/or storage characteristics). Accordingly, such an alkaline storage battery has been gaining attention as, for example, an alternative to a dry battery and a power source for an electric vehicle, and the like. Meanwhile, a lithium ion secondary battery has been used in similar applications in recent years. Therefore, from the viewpoint of highlighting the advantages of the alkaline storage battery, there is a need to further improve the battery characteristics such as the capacity, the output characteristics, and/or the life characteristics.

In general, hydrogen storage alloys contain an element having high affinity for hydrogen and an element having low affinity for hydrogen. As the hydrogen storage alloys, those having a crystal structure such as an $AB_5$-type (e.g., $CaCu_5$-type), an $AB_3$-type (e.g., $CeNi_3$-type), or an $AB_2$-type (e.g., $MgCu_2$-type) are used, for example. In these crystal structures, the element having high affinity for hydrogen tends to be located in an A-site, and the element having low affinity for hydrogen tends to be located in a B-site.

To improve the battery characteristics of the alkaline storage battery, attempts have been made to optimize the performance of hydrogen storage alloy powders.

For example, in PTL 1, a hydrogen storage alloy that contains Nd and has a ratio (B/A ratio) of an element having low affinity for hydrogen to an element having high affinity for hydrogen of 3.40 to 3.60 is combined with a hydrogen storage alloy that contains La and has a B/A ratio of 3.50 to 3.70.

In PTL 2, a hydrogen storage alloy having a B/A ratio of 2.5 to 4.5 is combined with a hydrogen storage alloy having a B/A ratio of 4.5 to 5.5 and contained in an amount of 50 mass % or less.

In PTL 3, a hydrogen storage alloy having a net-like continuous alloy skeleton structure in the matrix of the hydrogen storage alloy is investigated from the viewpoint of increasing the capacity, the life characteristics, and the like.

CITATION LIST

Patent Literatures

[PTL 1] Japanese Laid-Open Patent Publication No. 2012-156101
[PTL 2] Japanese Laid-Open Patent Publication No. 2006-40847
[PTL 3] Japanese Laid-Open Patent Publication No. H7-278708

SUMMARY OF INVENTION

Technical Problem

Although the hydrogen storage alloys used in PTL 1 can readily provide a high capacity because of having an $AB_3$-type crystal structure, they have a low corrosion resistance. Accordingly, the metals contained in the hydrogen storage alloys are likely to be eluted into the alkaline electrolyte.

According to PTL 2, the amount of the hydrogen storage alloy having an $AB_3$-type crystal structure, which has a low corrosion resistance, is large. Moreover, in the hydrogen storage alloy of an $AB_5$-type, the metals, including, for example, those (e.g., Co, Mn, and Al) that are located in a B-site, are likely to be eluted into the alkaline electrolyte. That is, based on PTL 2, it is difficult to sufficiently improve the corrosion resistance of the hydrogen storage alloys.

The metals that have been eluted from the hydrogen storage alloys are precipitated on, for example, a separator and/or an electrode, and cause a micro-short circuit, thereby easily causing self-discharge.

According to PTL 3, the matrix in the hydrogen storage alloy and the alloy skeleton formed in the matrix form a mixed crystal. However, it is difficult to manufacture such a mixed crystal.

Solution to Problem

Therefore, it is an object of an aspect of the present invention to provide an electrode alloy powder that is useful to obtain a nickel-metal hydride storage battery having a high battery capacity and a reduced self-discharge, an electrode for nickel-metal hydride storage batteries, and a nickel-metal hydride storage battery.

An aspect of the present invention relates to an electrode alloy powder being: a mixture including particles of a first hydrogen storage alloy having an $AB_5$-type crystal structure, and particles of at least one second hydrogen storage alloy selected from the group consisting of a hydrogen storage alloy a having an $AB_2$-type crystal structure and a hydrogen storage alloy b having an $AB_3$-type crystal structure, wherein an amount of the first hydrogen storage alloy included in the mixture is greater than 50 mass %.

Another aspect of the present invention relates to a negative electrode for nickel-metal hydride storage batteries, including the above-described electrode alloy powder as a negative electrode active material.

Yet another aspect of the present invention relates to a nickel-metal hydride storage battery including: a positive electrode; the above-described negative electrode; a separator interposed between the positive electrode and the negative electrode; and an alkaline electrolyte.

Advantageous Effects of Invention

According to the above-described aspects of the present invention, it is possible to suppress self-discharge due to a micro-short circuit in a nickel-metal hydride storage battery, while ensuring a high capacity.

While the novel features of the invention are set forth in the appended claims, the invention, both as to organization and content, will be better understood and appreciated, along with other objects and features thereof, from the following detailed description taken in conjunction with the drawing.

DESCRIPTION OF EMBODIMENT

Hereinafter, an embodiment of the present invention will be described with reference to the drawing as necessary.
[Electrode Alloy Powder]

An electrode alloy powder according to an embodiment of the present invention is an electrode alloy powder being: a mixture including particles of a first hydrogen storage alloy having an $AB_5$-type crystal structure, and particles of at least one second hydrogen storage alloy selected from the group consisting of a hydrogen storage alloy a having an $AB_2$-type crystal structure and a hydrogen storage alloy b having an $AB_3$-type crystal structure. The amount of the first hydrogen storage alloy (i.e., the first hydrogen storage alloy particles) contained in the mixture is greater than 50 mass %.

In general, a hydrogen storage alloy having an $AB_2$-type crystal structure (hereinafter also simply referred to as "$AB_2$-type hydrogen storage alloy") can readily provide a relatively high capacity. However, the hydrogen storage alloy undergoes severe expansion and contraction associated with absorption and release of hydrogen, and is thus significantly degraded due to the occurrence of cracking, making it difficult to achieve satisfactory cycle characteristics. A hydrogen storage alloy having an $AB_3$-type crystal structure (hereinafter also simply referred to as "$AB_3$-type hydrogen storage alloy") is advantageous for increasing the capacity, but has a low corrosion resistance, making the metals contained in the hydrogen storage alloy likely to be eluted into the alkaline electrolyte. Excessive elution would lead to degradation of the hydrogen storage alloy, resulting in a reduction in the cycle characteristics.

Although a hydrogen storage alloy having an $AB_5$-type crystal structure (hereinafter also simply referred to as "$AB_5$-type hydrogen storage alloy) and the $AB_2$-type hydrogen storage alloy have higher corrosion resistance than that of the $AB_3$-type hydrogen storage alloy, they may be problematic in terms of elution of metals from the hydrogen storage alloys.

Since the $AB_5$-type hydrogen storage alloy has a large B/A ratio, the metals (e.g., Co, Mn, and/or Al) located in a B-site are likely to be eluted into the electrolyte. In the case of the $AB_2$-type hydrogen storage alloy and the $AB_3$-type hydrogen storage alloy, the metals (e.g., Group 3 metals and/or Group 4 metals of the periodic table) located in an A-site are likely to be eluted into the electrolyte.

From the viewpoint of increasing the capacity, the activation of the hydrogen storage alloys is also important. To activate a hydrogen storage alloy, it is effective to elute the metals from the vicinity of the surface of the hydrogen storage alloy particles. However, when the metals that have been eluted from the hydrogen storage alloy into the electrolyte are precipitated, the capacity tends to decrease. In particular, the metals located in a B-site are likely to be precipitated. When the eluted metals are precipitated, segregation is likely to occur in which the metals are precipitated nonuniformly and locally. If metal segregation occurs in, for example, a separator and/or an electrode, a micro-short circuit may occur, thereby making self-discharge prone to occur. Further, the metal segregation results in a nonuniform charge/discharge reaction and/or partial depletion of the electrolyte, leading to degradation of the battery and a reduction in the cycle characteristics. Additionally, the elution of metals tends to be particularly pronounced at high temperatures, and therefore, the high temperature storage characteristics and/or the high-temperature life characteristics (or the cycle characteristics at high temperatures) may degrade.

In an embodiment of the present invention, the electrode alloy powder is a mixture of particles of a first hydrogen storage alloy having an $AB_5$-type crystal structure and particles of a second hydrogen storage alloy having an $AB_2$-type hydrogen storage alloy and/or an $AB_3$-type hydrogen storage alloy, and the amount of the first hydrogen storage alloy contained is greater than 50 mass %. Such an electrode alloy powder can suppress the occurrence of a micro-short circuit due to metal precipitation even if metals are eluted from the hydrogen storage alloys, making it possible to suppress self-discharge. Although the reason behind the ability to suppress self-discharge is unknown, it is presumed that the metals eluted from the first hydrogen storage alloy particles and the metals eluted from the second hydrogen storage alloy particles cause some interaction, thereby suppressing precipitation and/or segregation of the metals. Particularly, the metals (Co, Mn, and/or Al, in particular, Co and/or Mn, and the like) located in a B-site of the first hydrogen storage alloy particles are prone to undergo elution and segregation. However, the use of the above-described electrode alloy powder makes it possible to actually suppresses self-discharge and also provide a high capacity. Based on these facts, it is presumed that despite the occurrence of elution of the metals from the particles of the first and second hydrogen storage alloys, the precipitation and/or segregation of the metals (e.g., the metals located in a B-site) contained in the first hydrogen storage alloy particles is suppressed by the metals (e.g., the metals located at an A-site) eluted from the second hydrogen storage alloy particles.

Such an effect can be obtained because the electrode alloy powder is a mixture of the first hydrogen storage alloy particles and the second hydrogen storage alloy particles. For example, in the case of a hydrogen storage alloy containing both an $AB_5$-type crystal structure and an $AB_2$-type and/or an $AB_3$-type crystal structure, the metals of the crystal structures form metallic bonds therebetween (i.e., they are alloyed) at the interface between the crystal structures and the vicinity thereof, and the elution properties for an alkaline electrolyte of the hydrogen storage alloy is different from that of a mixture. Therefore, the interaction between the metals eluted from the first hydrogen storage alloy and the metals eluted from the second hydrogen storage alloy as described above cannot be achieved, and the effect of suppressing self-discharge also cannot be attained.

The first hydrogen storage alloy having an $AB_5$-type crystal structure means a hydrogen storage alloy having a B/A ratio of 4.5 to 5.5, for example, and the hydrogen storage alloy a having an $AB_2$-type crystal structure means a hydrogen storage alloy having a B/A ratio of 1.5 to 2.5, for example. The hydrogen storage alloy b having an $AB_3$-type crystal structure means a hydrogen storage alloy having a B/A ratio greater than 2.5 and less than 4.5, for example.

In the following, the electrode alloy powder will be described in further detail.

(First Hydrogen Storage Alloy Particles)

Preferably, the first hydrogen storage alloy contains an element $L^1$, an element $M^1$, and Ni. The first hydrogen storage alloy may contain an element $E^1$ as an optional component. The element $L^1$ is at least one selected from the group consisting of Group 3 elements and Group 4 elements of the periodic table, and the element $M^1$ is an alkaline-earth metal element.

Group 3 elements of the periodic table serving as the element $L^1$ include Sc, Y, lanthanoid elements, and actinoid elements. The lanthanoid elements include La, Ce, Pr, Nd, Pm, Sm, Eu, Gd, Tb, Dy, Ho, Er, Tm, Yb, and Lu. The actinoid elements include, for example, Ac, Th, Pa, and Np. Group 4 elements of the periodic table serving as the element $L^1$ include Ti, Zr, and Hf.

The element $L^1$ may include one or a combination of two or more of these elements. Preferably, the element $L^1$ includes at least one selected from the group consisting of Sc, Y, lanthanoid elements, Ti, and Zr. Particularly preferably, the element $L^1$ includes at least one selected from the group consisting of Y and lanthanoid elements.

The alkaline-earth metal element serving as the element $M^1$ includes Mg, Ca, Sr, and Ba. The element $M^1$ may include one or a combination of two or more of these alkaline-earth metal elements. The inclusion of such an element $M^1$ facilitates formation of an ionic bonded hydride and improves the hydrogen absorbing capability, thus facilitating an increase in the capacity. As the element $M^1$, it is preferable to use Mg and/or Ca.

Preferably, the element $M^1$ includes at least Mg. Mg is prone to attract an oxygen molecule and easily migrates to the surface of the hydrogen storage alloy, and therefore, an anti-corrosive protection coating containing, for example, an oxide and/or a hydroxide containing Mg is formed on the surface of the hydrogen storage alloy. Although metallic Mg is likely to be eluted in an alkaline electrolyte, such a protection coating is stable, easily ensures high discharge characteristics, and makes it easy to suppress elution of metals (e.g., the metals located in a B-site) from the first hydrogen storage alloy. Accordingly, the effect of suppressing self-discharge can be more easily achieved.

When the element $M^1$ includes Mg, the ratio of Mg in the element $M^1$ is, for example, 70 mol % or more, preferably 80 mol % or more, further preferably 90 mol % or more. The ratio of Mg in the element $M^1$ is 100 mol % or less. It is also preferable that the element $M^1$ includes Mg only (i.e., the ratio of Mg in the element $M^1$ is 100 mol %).

The molar ratio $\alpha$ of the element $M^1$ in the sum of the element $L^1$ and the element $M^1$ is, for example, 0.037 or more, preferably 0.04 or more, further preferably 0.045 or more. The molar ratio $\alpha$ is, for example, 0.133 or less, preferably 0.132 or less, further preferably 0.13 or less. These lower limits and upper limits can be arbitrarily combined. The molar ratio $\alpha$ may satisfy, for example, $0.037 \leq \alpha \leq 0.133$ or $0.04 \leq \alpha \leq 0.133$. When the molar ratio $\alpha$ is within such a range, the reduction in the corrosion resistance to the electrolyte and the reduction in the hydrogen storage capability can be easily suppressed. In addition, the degradation of the first hydrogen storage alloy can be easily suppressed.

The first hydrogen storage alloy contains Ni as an essential component.

The molar ratio $x^1$ of Ni to the sum of the element $L^1$ and the element $M^1$ is, for example, 3.5 or more, preferably 3.6 or more, further preferably 3.8 or more. The molar ratio $x^1$ is, for example, 4.32 or less, preferably 4.31 or less, further preferably 4.3 or less. These lower limits and upper limits can be arbitrarily combined. The molar ratio $x^1$ may satisfy, for example, $3.5 \leq x^1 \leq 4.32$, or $3.6 \leq x^1 \leq 4.31$. When the molar ratio $x^1$ is within this range, the reduction in the capacity and the corrosion resistance to the electrolyte of the hydrogen storage alloy can be easily suppressed.

The element $E^1$ is, for example, at least one selected from the group consisting of Group 5 to Group 11 transition metal elements (excluding Ni), Group 12 elements, Group 13 elements in the second period to the fifth period, Group 14 elements in the third period to the fifth period of the periodic table, and P. Examples of the transition metal elements include V, Nb, Ta, Cr, Mo, W, Mn, Fe, Co, Pd, Cu, and Ag. Examples of the Group 12 elements include Zn, and examples of the Group 13 elements include B, Al, Ga, and In. Examples of the Group 14 elements include Si, Ge, and Sn. The first hydrogen storage alloy can contain the element $E^1$ as an essential component.

Preferably, the element $E^1$ is at least one selected from the group consisting of V, Nb, Ta, Cr, Mo, W, Mn, Fe, Co, Cu, Ag, Zn, Al, Ga, In, Si, Ge, and Sn.

Particularly preferably, the element $E^1$ includes at least Co, Mn and/or Al. Co, Mn and Al (particularly, Co and Mn) are likely to be eluted in an alkaline electrolyte. In the embodiment of the present invention, self-discharge can be suppressed even when the first hydrogen storage alloy contains such a metallic element that is likely to be eluted.

When the element $E^1$ includes Co, Co enters a B-site and the bonding between Co and the surrounding elements is easily strengthened. Therefore, it is easy to suppress generation of a crystal defect due to expansion and contraction of the alloy during absorption and release of hydrogen.

When the element $E^1$ includes Co, the molar ratio $z^{1a}$ of Co to the sum of the element $L^1$ and the element $M^1$ is 0.13 or more, preferably 0.15 or more, further preferably 0.3 or more or 0.37 or more. The molar ratio $z^{1a}$ of Co is 0.5 or less, preferably 0.47 or less, further preferably 0.45 or less. These lower limits and upper limits can be arbitrarily combined. The molar ratio $z^{1a}$ of Co may satisfy, for example, $0.13 \leq z^{1a} \leq 0.5$, or $0.15 \leq z^{1a} \leq 0.47$.

When the molar ratio $z^{1a}$ of Co is within the above-described range, cracking of the alloy can be more effectively suppressed even after repeated charging and discharging, thereby making it possible to more effectively suppress life degradation. Furthermore, elution of Co can be easily suppressed, which is also advantageous from the viewpoint of suppressing the occurrence of a micro-short circuit.

When the element $E^1$ includes Co, Mn and/or Al, the ratio of Co, Mn and Al in total in the element $E^1$ is, for example, 80 mol % or more, preferably 85 mol % or more, further preferably 90 mol % or more. The ratio of Co, Mn and Al in total in the element $E^1$ is 100 mol % or less. It is also preferable that the element $E^1$ is composed only of Co, Mn and/or Al.

When the element $E^1$ includes Mn, high hydrogen storage capability can be readily achieved because the hydrogen equilibrium pressure can be easily lowered. When the element $E^1$ includes Al, the hydrogen equilibrium pressure can be easily adjusted, and moreover, cracking of the alloy can be suppressed effectively.

From the viewpoint of more effectively suppressing generation of a crystal defect during absorption and release of hydrogen, while improving the hydrogen storage capability and the corrosion resistance, it is preferable that the element $E^1$ includes both Mn and Al. In this case, the molar ratio (=Mn/Al) between Mn and Al is, for example, 0.3/0.7 to 0.7/0.3, preferably 0.4/0.6 to 0.67/0.33, further preferably 0.5/0.5 to 0.63/0.37.

The sum $x^1+z^1$ of the molar ratio $x^1$ of Ni and the molar ratio $z^1$ of the element E respectively to the sum of the element $L^1$ and the element $M^1$ corresponds to the B/A ratio. $x^1+z^1$ is 4.5 or more, preferably 4.78 or more, further preferably 4.79 or more or 4.8 or more. $x^1+z^1$ is 5.5 or less, preferably 5.2 or less. $x^1+z^1$ may be less than 5.03, preferably 5.025 or less, or 5.02 or less. These lower limits and upper limits can be arbitrarily combined. $x^1+z^1$ may satisfy, for example, $4.5 \leq x^1+z^1 \leq 5.5$, $4.78 \leq x^1+z^1 \leq 5.2$, $4.79 \leq x^1+z^1 < 5.03$, or $4.8 \leq x^1+z^1 \leq 5.025$.

When $x^1+z^1$ is within the range as described above, it is possible to suppress the inhibition of the battery reaction resulting from the degradation of the hydrogen storage alloy and the precipitation of metals, which may be caused by an increased amount of elution of the elements, such as the element $E^1$, located in a B-site and/or the element $M^1$ such as Mg and/or destabilized crystal structures. Therefore, the reduction in the capacity and/or the cycle life can be easily suppressed.

Among the first hydrogen storage alloys, it is preferable to use a hydrogen storage alloy (hereinafter also simply referred to as "first hydrogen storage alloy A") containing the element $L^1$, the element $M^1$, Ni, and the element $E^1$, wherein the element $L^1$ includes La as an essential component and does not include Nd, or the ratio of Nd in the element $L^1$ is less than 5 mass % when the element $L^1$ includes Nd, and the ratio of La in the first hydrogen storage alloy is 23 mass % or less. The use of the first hydrogen storage alloy A allows the capacity to be increased easily and high life characteristics to be readily achieved. Preferably, the element $E^1$ includes at least one selected from the group consisting of Co, Mn and Al.

In the first hydrogen storage alloy A, the molar ratio of each of the elements and the B/A ratio can be selected from the above-described ranges. The molar ratio α of the element $M^1$ satisfies preferably $0.045 \leq \alpha \leq 0.133$, further preferably $0.04 \leq \alpha \leq 0.13$. The molar ratio $x^1$ of Ni satisfies preferably $3.5 \leq x^1 \leq 4.32$, further preferably $3.6 \leq x^1 \leq 4.3$. $x^1+z^1$ satisfies preferably $4.78 \leq x^1+z^1 < 5.03$, further preferably $4.8 \leq x^1+z^1 < 5.03$. When the first hydrogen storage alloy A contains Co, the molar ratio $z^{1a}$ of Co satisfies preferably $0.13 \leq z^{1a} \leq 0.5$, further preferably $0.15 \leq z^{1a} \leq 0.45$.

In the first hydrogen storage alloy A, the element $L^1$ is preferably a lanthanoid element. The ratio of La in the first hydrogen storage alloy A is, for example, 23 mass % or less, preferably 22.5 mass % or less, further preferably 22.3 mass % or less. The ratio of La in the first hydrogen storage alloy A is, for example, 20 mass % or more, preferably 21 mass % or more, further preferably 21.5 mass % or more. These upper limits and the lower limits can be arbitrarily combined. The ratio of La in the first hydrogen storage alloy A may be, for example, 20 to 23 mass %, or 21 to 22.5 mass %. A ratio of La in the first hydrogen storage alloy A within such a range is beneficial in increasing the capacity, and makes it easy to suppress the reduction in the corrosion resistance of the hydrogen storage alloy, making it easy to suppress the reduction in the life characteristics and the high temperature storage characteristics.

In view of ease of cost reduction and ease of ensuring high hydrogen storage capability, the element $L^1$ does not include Nd, or the ratio of Nd in the element $L^1$ is less than 5 mass %, preferably 3.5 mass % or less, further preferably 2 mass % or less, when the element $L^1$ includes Nd, in the first hydrogen storage alloy A.

The average particle size $D_1$ of the first hydrogen storage alloy particles is, for example, 20 to 60 μm, preferably 30 to 50 μm, further preferably 30 to 40 μm. An average particle size $D_1$ within this range makes it possible to easily suppress a micro-short circuit, while facilitating activation of the first hydrogen storage alloy.

Note that, as used herein, the average particle size means a median diameter on a volume basis.

The amount of the first hydrogen storage alloy (i.e., the first hydrogen storage alloy particles) contained in the mixture is greater than 50 mass %, preferably 60 mass % or more, further preferably 70 mass % or more, or 80 mass % or more. The amount of the first hydrogen storage alloy in the mixture is, for example, 97 mass % or less, preferably 95 mass % or less, further preferably 90 mass % or less. These lower limits and upper limits can be arbitrarily combined. The amount of the first hydrogen storage alloy in the mixture may be, for example, 60 to 97 mass %, 60 to 95 mass %, or 70 to 95 mass %.

When the amount of the first hydrogen storage alloy is 50 mass % or less, the amount of the second hydrogen storage alloy becomes relatively large, as a result of which the amount of the metals (e.g., the metals located in a B-site) eluted from the second hydrogen storage alloy excessively increases, making it impossible to suppress the metal precipitation. Accordingly, a micro-short circuit cannot be suppressed, resulting in a significant self-discharge.

(Second Hydrogen Storage Alloy Particles)

The second hydrogen storage alloy particles are at least one selected from the group consisting of particles of an $AB_2$-type hydrogen storage alloy a and particles of an $AB_3$-type hydrogen storage alloy b.

(Hydrogen Storage Alloy a)

The hydrogen storage alloy a includes, for example, an element $L^2$, Ni, and an element $E^2$. Preferably, the element $L^2$ is at least one selected from the group consisting of Group 4 elements of the periodic table. Group 4 elements of the periodic table include Ti, Zr, and Hf. It is considered that as a result of the hydrogen storage alloy a containing the element $L^2$, the element $L^2$ eluted from the second hydrogen storage alloy interacts with a metal eluted from the first hydrogen storage alloy, making it possible to suppress self-discharge. Preferably, the element $L^2$ includes at least one selected from the group consisting of Ti and Z. When the element $L^2$ includes Ti and/or Zr, the effect of suppressing self-discharge becomes significant. The element $L^2$ includes Zr and/or Ti, and may include Hf as necessary.

The ratio of Zr and Ti in total in the element $L^2$ is, for example, 80 mol % or more, preferably 85 mol % or more, further preferably 90 mol % or more. The ratio of Zr and Ti in total in the element $L^2$ is 100 mol % or less. It is also preferable that the element $L^2$ is composed only of Zr and/or Ti, and it is also preferable that the element $L^2$ includes at least Zr.

When the element $L^2$ includes both Zr and Ti, the molar ratio (=Zr/Ti) between Zr and Ti is, for example, 0.5/0.5 to 0.99/0.01, preferably 0.6/0.4 to 0.95/0.05, further preferably 0.7/0.3 to 0.95/0.05.

The molar ratio $x^2$ of Ni to the element $L^2$ satisfies, for example, $0.8 \leq x^2 < 1.5$, preferably $0.9 \leq x^2 \leq 1.4$, further preferably $1 \leq x^2 \leq 1.3$. When the molar ratio $x^2$ is within this range, the reduction in the capacity and corrosion resistance to the electrolyte of the hydrogen storage alloy can be easily suppressed.

The element $E^2$ is at least one selected from the group consisting of Group 5 to Group 11 transition metal elements (excluding Ni), Group 12 elements, Group 13 elements in the second period to the fifth period, Group 14 elements in the third period to the fifth period of the periodic table, and P. Examples of the transition metal elements include V, Nb, Ta, Cr, Mo, W, Mn, Fe, Co, Pd, Cu, and Ag. The elements other than the transition metal elements are the same as those given as the examples of the element $E^1$. Preferably, the element $E^2$ is at least one selected from the group consisting of V, Nb, Ta, Cr, Mo, W, Mn, Fe, Co, Cu, Ag, Zn, Al, Ga, In, Si, Ge, and Sn.

Preferably, the element $E^2$ at least includes at least one selected from the group consisting of Al and Mn. Preferably, the element $E^2$ includes at least Al, and may include at least Al and Mn.

When the element $E^2$ includes Mn and/or Al, the ratio of Mn and Al in total in the element $E^2$ is, for example, 80 mol % or more, preferably 85 mol % or more, further preferably 90 mol % or more. The ratio of Mn and Al in total in the element $E^2$ is 100 mol % or less. It is also preferable that the element $E^2$ is composed only of Mn and/or Al.

Al and Mn facilitate the reduction in the hydrogen equilibrium pressure of the hydrogen storage alloy a, and thus can readily provide high hydrogen storage capability. The use of V can reduce the hydrogen equilibrium pressure, but is disadvantageous in term of costs because metallic V is an expensive raw material. Since Al and Mn (particularly, Al) are low-cost raw materials, the use of Al and Mn is advantageous in term of costs as well. Mn is also advantageous in that it facilitates the increase of the reactivity during absorption of hydrogen. Further, Mn and Al are likely to be eluted also from the hydrogen storage alloy a, as in the case of the first hydrogen storage alloy. According to the embodiment of the present invention, self-discharge due to a micro-short circuit can be suppressed even if such an element that is likely to be eluted is contained.

When the element $E^2$ includes Al, the molar ratio $z^{2a}$ of Al to the element $L^2$ satisfies, for example, $0.05 \leq z^{2a} \leq 0.35$, preferably $0.1 \leq z^{2a} \leq 0.3$, further preferably $0.15 \leq z^{2a} \leq 0.25$. When the molar ratio $z^{2a}$ is within this range, the capacity can be easily increased and self-discharge can be more effectively suppressed.

The sum $x^2+z^2$ of the molar ratio $x^2$ of Ni and the molar ratio $z^2$ of the element $E^2$ respectively to the element $L^2$ corresponds to the B/A ratio. $x^2+z^2$ is 1.5 or more, preferably 1.7 or more, further preferably 1.8 or more. $x^2+z^2$ is 2.5 or less, preferably 2.2 or less, further preferably 2.1 or less, or 2 or less. These lower limits and upper limits can be arbitrarily combined. $x^2+z^2$ may satisfy $1.5 \leq x^2+z^2 \leq 2.5$, $1.7 \leq x^2+z^2 \leq 2.2$, $1.8 \leq x^2+z^2 \leq 2.2$, or $1.8 \leq x^2+z^2 \leq 2.1$.

When $x^2+z^2$ is within the range as described above, the reduction in releasability of the stored hydrogen can be easily suppressed, and the decrease of the hydride phase that can absorb and release hydrogen can be easily suppressed. Accordingly, the effective capacity reduction can be easily suppressed.

(Hydrogen Storage Alloy b)

The hydrogen storage alloy b can contain an element $L^3$, an element $M^2$, and Ni as essential components. The hydrogen storage alloy b may contain an element $E^3$ as an optional component.

The element $L^3$ is at least one selected from the group consisting of Group 3 elements and Group 4 elements of the periodic table. Examples of Group 3 elements and Group 4 elements of the periodic table include elements given as the examples of the element $L^1$.

Preferably, the element $L^3$ includes at least one selected from the group consisting of Sc, Y, and lanthanoid elements (particularly, the group consisting of Y and lanthanoid elements). Among the lanthanoid elements, it is preferable to use La, Ce, Pr, Nd, and Sm, and it is particularly preferable to use La and Sm.

From the viewpoint of further increasing the capacity, it is preferable that the element $L^3$ includes Sc and/or a lanthanoid element, and it is more preferable that the element $L^3$ includes a lanthanoid element (particularly, at least La). The element $L^3$ may include a lanthanoid element (particularly, at least La) and at least one selected from the group consisting of Sc and Group 4 elements of the periodic table.

From the viewpoint of enhancing the corrosion resistance, the element $L^3$ preferably includes at least Y. The element $L^3$ may include Y and a lanthanoid element (particularly, at least La), or may include Y, a lanthanoid element (particularly, at least La), and at least one selected from the group consisting of Sc and Group 4 elements of the periodic table.

Y has strong affinity for oxygen, and has the ability to reduce the surrounding oxides. Accordingly, when the element $L^3$ includes Y, the corrosion (particularly, corrosion at high temperatures) of the hydrogen storage alloy can be more effectively suppressed.

Here, the reduction ability of Y can be explained with the Pauling's electronegativity. The Pauling's electronegativity is a scale of indicating the tendency of an atom to attract electrons. The binding energy between elements is associated with the square of the difference between the Pauling's electronegativities. The larger the difference between the electronegativities, the greater the binding energy is. The Pauling's electronegativities of the elements Y, Ni, Co and Al contained in the above-described hydrogen storage alloy are 1.2, 1.8, 1.8, and 1.5, respectively. Meanwhile, the electronegativity of O is 3.5. The element having the largest electronegativity difference with oxygen is Y, and Y has a strong binding energy to oxygen.

In other words, can be seen that Y has strong affinity for oxygen.

It is considered that as a result of the hydrogen storage alloy b containing a Group 3 element and/or a Group 4 element of the periodic table as the element $L^3$, the element $L^3$ eluted from the second hydrogen storage alloy interacts with a metal eluted from the first hydrogen storage alloy, making it possible to suppress self-discharge. In particular, when the element $L^3$ includes at least one selected from the group consisting of Ti and Zr, a higher self-discharge suppressing effect can be easily achieved.

The alkaline-earth metal element serving as the element $M^2$ includes Mg, Ca, Sr, and Ba. The element $M^2$ may include one or a combination of two or more of these alkaline-earth metal elements. The inclusion of such an element $M^2$ leads to an increased activity to hydrogen, making it easy to increase the amount of hydrogen absorbed. As the element $M^2$, it is preferable to use Mg and/or Ca. In view of further increasing the activity to hydrogen, the element $M^2$ preferably includes at least Mg. When the element $M^2$ includes Mg, the ratio of Mg in the element $M^2$ can be appropriately selected from the same range as that for the ratio of the Mg in the element $M^1$.

The molar ratio $\beta$ of the element $M^2$ in the sum of the element $L^3$ and the element $M^2$ is, for example, 0.008 or more, preferably 0.009 or more, further preferably 0.01 or more or 0.25 or more. The molar ratio $\beta$ is 0.54 or less, preferably 0.52 or less, further preferably 0.5 or less, or 0.35 or less. These lower limits and upper limits can be arbitrarily combined. The molar ratio $\beta$ may satisfy, for example, $0.008 \leq \beta \leq 0.52$, $0.01 \beta \leq 0.5$, or $0.25 \leq \beta \leq 0.35$. When the molar ratio $\beta$ is within such a range, the degradation of the hydrogen storage alloy b can be easily suppressed, and the reduction in the corrosion resistance can be easily suppressed.

The molar ratio $x^3$ of Ni to the sum of the element $L^3$ and the element $M^2$ is, for example, 1.6 or more, preferably 1.8 or more, further preferably 2 or more. The molar ratio $x^3$ is 4 or less, preferably 3.5 or less, further preferably 3.3 or less. These lower limits and upper limits can be arbitrarily combined. The molar ratio $x^3$ may satisfy, for example, $1.6 \leq x^3 \leq 4$, or $2 \leq x^3 \leq 3.5$. When the molar ratio $x^3$ is within such a range, it is easy to ensure a sufficiently high capacity, while suppressing self-discharge.

The element $E^3$ is at least one selected from the group consisting of Group 5 to Group 11 transition metal elements (excluding Ni), Group 12 elements, Group 13 elements in the second period to the fifth period, Group 14 elements in the third period to the fifth period of the periodic table, N, P, and S. Examples of each of the elements include the same elements as those described for the element $E^1$ and the element $E^2$.

The hydrogen storage alloy b can contain an element $E^3$ as an essential component.

From among the above-described elements serving as the element $E^3$, the element $E^3$ can include at least one element $E^{3a}$ selected from the group consisting of Group 5 to Group 11 transition metal elements (excluding Ni), Group 12 elements, Group 13 elements in the second period to the fifth period of the periodic table, Si, and P. Among these elements serving as the element $E^{3a}$, it is preferable to use at least one selected from the group consisting of V, Nb, Ta, Cr, Mo, W, Mn, Fe, Co, Cu, Ag, Zn, B, Al, Ga, In, Si, and P. When the hydrogen storage alloy b contains the element $E^{3a}$, it is possible to more effectively suppress generation of a significant crystal defect associated with absorption and release of hydrogen. Further, high charge/discharge characteristics can be readily achieved, and moreover, the cost can be easily reduced.

Preferably, the element $E^{3a}$ includes at least Al. According to the embodiment of the present invention, it is possible to suppress self-discharge even when the element $E^{3a}$ includes Al, which has high solubility in an electrolyte (i.e., when the hydrogen storage alloy b contains Al).

When the element $E^{3a}$ includes Al (element $E^{3a-1}$), the molar ratio $\gamma^1$ of Al to the sum of the element $L^3$ and the element $M^2$ is, for example, 0.008 or more, preferably 0.01 or more, further preferably 0.015 or more or 0.02 or more. The molar ratio $\gamma^1$ is, for example, 0.32 or less, preferably 0.3 or less, further preferably 0.15 or less, or 0.1 or less (or 0.07 or less). These lower limits and upper limits can be arbitrarily combined. The molar ratio $\gamma^1$ may satisfy, for example, $0.008 \leq \gamma^1 \leq 0.32$, $0.01 \leq \gamma^1 \leq 0.3$, or $0.01 \leq \gamma^1 \leq 0.15$. When the molar ratio $\gamma^1$ is within such a range, the hydrogen equilibrium pressure can be easily lowered, and high hydrogen storage capability can be readily achieved. Moreover, the degradation of the hydrogen storage alloy b can be easily suppressed.

The element $E^{3a}$ may include Al (element $E^{3a-1}$) and an element $E^{3a}$ (element $E^{3a-2}$) other than Al.

The molar ratio $\gamma^2$ of the element $E^{3a-2}$ to the sum of the element $L^3$ and the element $M^2$ is 0 or more, preferably 0.01 or more or 0.05 or more, further preferably 0.1 or more or 0.2 or more. The molar ratio $\gamma^2$ is preferably 0.8 or less, further preferably 0.75 or less. These lower limits and upper limits can be arbitrarily combined. The molar ratio $\gamma^2$ may satisfy, for example, $0.01 \leq \gamma^2 \leq 0.8$, or $0.2 \leq \gamma^2 \leq 0.75$.

It is also preferable that the element $E^{3a}$ (or element $E^{3a-2}$) includes at least Co. Although the quantitative details are unknown, Co enters a B-site to strengthen the bonding between Co and the surrounding elements when the element $E^{3a}$ includes Co. This makes it possible to more effectively suppress generation of a crystal defect associated with expansion and contraction of the alloy during absorption and release of hydrogen. Accordingly, cracking of the alloy can be more effectively suppressed even after repeated charging and discharging, thereby making it possible to more effectively suppress the life degradation.

When the element $E^{3a}$ includes Co, the molar ratio $\gamma^3$ of Co to the sum of the element $L^3$ and the element $M^2$ satisfies, for example, preferably $0.2 \leq \gamma^3 \leq 0.8$, more preferably $0.25 \leq \gamma^3 \leq 0.75$. When the molar ratio $\gamma^3$ is within this range, it is easy to suppress the generation of a crystal defect during absorption of hydrogen and ensure the hydrogen absorption site. Therefore, the capacity can be easily increased.

The element $E^3$ may include at least one element $E^{3b}$ selected from the group consisting of Ge and Sn. When the element $E^3$ includes the element $E^{3b}$, a composite hydroxide containing the element $E^{3b}$ can be easily formed, thus making it possible to more effectively suppress the degradation of the hydrogen storage alloy b.

Among the elements serving as the element $E^{3b}$, Sn has the ability to suppress expansion and contraction during absorption and release of hydrogen. Accordingly, when the element $E^{3b}$ includes Sn, excessive expansion and contraction can be suppressed especially at the time of absorption and release of hydrogen at high temperatures. This makes it possible to suppress the corrosion of the hydrogen storage alloy.

Among the elements serving as the element $E^{3b}$, Ge easily forms a composite hydroxide containing Ge and Y when combined with Y serving as the element $L^3$, and thus can more effectively suppress the degradation of the alloy.

The molar ratio $\gamma^4$ of the element $E^{3b}$ to the sum of the element $L^3$ and the element $M^2$ is 0.01 or more, preferably 0.015 or more. The molar ratio $\gamma^4$ is 0.12 or less, preferably 0.11 or less, further preferably 0.1 or less. These lower limits and upper limits can be arbitrarily combined. The molar ratio $\gamma^4$ may satisfy, for example, $0.01 \leq \gamma^4 \leq 0.11$, or $0.01 \leq \gamma^4 \leq 0.1$.

When the molar ratio $\gamma^4$ is within the above range, a capacity reduction due to excessive replacement of the constituent elements of the alloy other than the element $E^{3b}$ and/or durability degradation due to introduction of a lattice defect can be suppressed. Even when the element $E^{3b}$ includes Sn, it is also possible to suppress excessive segregation of Sn and the reduction in the electron conductivity at low temperatures.

Among hydrogen storage alloys serving as the hydrogen storage alloy b, it is preferable to use a hydrogen storage alloy b1 containing an element $L^{3a}$, Mg, Ni, Al and an element $M^a$. In the hydrogen storage alloy b1, the element $L^{3a}$ is any of the elements $L^3$ excluding Y, and the element $M^3$ is at least one (or at least two) selected from the group consisting of Ge, Y and Sn. The molar ratio of Mg to the sum of the element $L^{3a}$ and Mg can be selected from the same range as that for the molar ratio $\beta$ of the element $M^2$. The molar ratio of Ni to the sum of the element $L^{3a}$ and Mg can be selected from the same range as that for the molar ratio $x^3$ of Ni, and the molar ratio of Al to the sum of the element $L^{3a}$ and Mg can be selected from the same range as that for the molar ratio $\gamma^1$ of Al. The molar ratio of the element $M^a$ to the sum of the element $L^{3a}$ and Mg can be selected from the same range as that for the molar ratio $\gamma^4$ of the element $E^{3b}$. The use of such a hydrogen storage alloy b1 easily increases the surface activity, and thus can enhance discharge characteristics such as low-temperature discharge characteristics. Furthermore, the elution resistance of the metals is enhanced to suppress the degradation of the hydrogen storage alloy b1, making it possible to enhance the life characteristics and facilitate the capacity increase.

The sum $x^3+z^3$ of the molar ratio $x^3$ of Ni and the molar ratio $z^3$ of the element $E^3$ respectively to the sum of the element $L^3$ and the element $M^2$ corresponds to the B/A ratio. $x^3+z^3$ is greater than 2.5, preferably 2.7 or more, further preferably 2.8 or more. $x^3+z^3$ is less than 4.5, preferably 4 or less, further preferably 3.5 or less, or 3.3 or less. These lower limits and upper limits can be arbitrarily combined. $x^3+z^3$ may satisfy, for example, $2.5<x^3+z^3<4.5$, $2.7\leq x^3+z^3\leq 4$, or $2.8\leq x^3+z^3\leq 4$.

When $x^3+z^3$ is within this range, the reduction in the reactivity and the reduction in the chargeable and dischargeable capacity can be easily suppressed.

The second hydrogen storage alloy particles may include only the particles of the hydrogen storage alloy a or the particles of the hydrogen storage alloy b, or may include both the particles of the hydrogen storage alloy a and the particles of the hydrogen storage alloy b. When the second hydrogen storage alloy particles include both the particles of the hydrogen storage alloy a and the particles of the hydrogen storage alloy b, their mass ratio (=a/b) can be selected from, for example, the range of 1/99 to 99/1, and may be 10/90 to 90/10, or 20/80 to 80/20.

The average particle size $D_2$ of the particles of the second hydrogen storage alloy is, for example, 15 to 50 μm, preferably 20 to 30 μm, further preferably 20 to 27 μm. When the average particle size $D_2$ is within this range, the elution properties of the metals (particularly, the metals located in a A-site, and the like) from the second hydrogen storage alloy can be easily enhanced, and therefore, a micro-short circuit can be easily suppressed even when the metals are eluted from the first hydrogen storage alloy particles.

The electrode alloy powder may be any mixture of the first hydrogen storage alloy particles and the second hydrogen storage alloy particles, and may be a mixture in which the second hydrogen storage alloy particles are dispersed over the surface of the first hydrogen storage alloy particles, or a mixture in which the first hydrogen storage alloy particles are dispersed over the surface of the second hydrogen storage alloy particles. The mixture in which the second hydrogen storage alloy particles are dispersed over the surface of the first hydrogen storage alloy particles is more preferable from the viewpoint of suppressing the precipitation of the metals eluted from the first hydrogen storage alloy particles. In such a mixture, the ratio $D_1/D_2$ of the average particle size $D_1$ of the particles of the first hydrogen storage alloy to the average particle size $D_2$ of the particles of the second hydrogen storage alloy is, for example, 0.4 to 4, preferably greater than 1 and 3 or less, further preferably 1.1 to 2.

The electrode alloy powder according to the embodiment of the present invention can suppress self-discharge due to a micro-short circuit, while ensuring a high capacity, and thus is suitably used as a negative electrode active material of a nickel-metal hydride storage battery.

(Method for Producing Electrode Alloy Powder)

The electrode alloy powder can be obtained by mixing the first hydrogen storage alloy particles with the second hydrogen storage alloy particles.

The first hydrogen storage alloy particles and the second hydrogen storage alloy particles (specifically, the particles of the hydrogen storage alloy a and the particles of the hydrogen storage alloy b) can be each obtained through:

(i) step A of forming an alloy from simple substances of the constituent elements of a hydrogen storage alloy;
(ii) step B of granulating the alloy obtained in step A; and
(iii) step C of activating granules obtained in step B.

(i) Step A (Alloying Step)

In step A, an alloy can be formed from simple substances of constituent components by, for example, using a known alloying method. As such an alloying method, it is possible to use, for example, plasma arc melting, high-frequency melting (die casting), mechanical alloying, mechanical milling, rapid solidification (specifically, roll spinning, melt dragging, direct casting and rolling, in-rotating liquid spinning, spray forming, gas atomization, wet atomization, splat cooling, rapid-solidified-ribbon grinding, gas atomization and splat cooling, melt extraction, rotating electrode processing, and the like as described in, for example, Kinzoku Zairyo Katsuyou Jiten (Metal Material Application Manual) (Industrial Research Center of Japan, 1999)). These methods may be used alone or in combination of two or more.

In step A, simple substances of the constituent elements are mixed together, and the resulting mixture can be alloyed by using any of the above-described methods, for example. The mixture may be molten by heating, to alloy the constituent elements. For example, plasma arc melting, high-frequency melting (die casting), and rapid solidification are suitable for such alloying. It is also possible to combine rapid solidification with mechanical alloying.

In step A, when mixing the simple substances of the constituent elements, the molar ratio, mass ratio, or the like of each of the simple substances is adjusted such that the hydrogen storage alloy has the desired composition.

The molten alloy is solidified prior to the granulation in step B. The solidification of the alloy can be performed by supplying the molten alloy into a mold or the like as necessary, and cooling the alloy inside the mold. From the viewpoint of increasing the dispersibility of the constituent elements in the alloy, the supply rate or the like may be adjusted as appropriate.

The resulting solidified alloy (ingot) may be heat-treated as necessary. The heat treatment facilitates adjustment of the dispersibility of the constituent elements in the hydrogen storage alloy, making it possible to more effectively suppress elution and/or segregation of the constituent elements and facilitate activation of the hydrogen storage alloy.

Heating is not particularly limited, and may be performed, for example, at a temperature of 900 to 1200° C. under an inert gas atmosphere such as argon.

(ii) Step B (Granulation Step)

In step B, the alloy (specifically, the ingot) obtained in step A is granulated. The granulation of the alloy can be performed by wet grinding, dry grinding, or the like. These methods may be performed in combination. Grinding can be performed with a ball mill or the like. In wet grinding, the ingot is ground using a liquid medium such as water. Note that the resulting particles may be classified as necessary.

The alloy particles obtained in step B may be occasionally referred to as a starting powder of the electrode alloy powder.

(iii) Step C (Activation Step)

In step C, the activation of the ground material (starting powder) can be performed by bringing the ground material into contact with an aqueous alkaline solution. The contact between the aqueous alkaline solution and the starting powder can be performed, without any particular limitation, for example, by immersing the starting powder in the aqueous alkaline solution, adding the starting powder to the aqueous alkaline solution and stirring the aqueous alkaline solution, or spraying the aqueous alkaline solution to the starting powder. The activation may be performed under heat as necessary.

As the aqueous alkaline solution, it is possible to use an aqueous solution containing, for example, an alkali metal hydroxide such as potassium hydroxide, sodium hydroxide, or lithium hydroxide as an alkali. Among these, it is preferable to use sodium hydroxide and/or potassium hydroxide.

From the viewpoint of the activation efficiency, the productivity, the process reproducibility, and the like, the alkali concentration in the aqueous alkaline solution is, for example, 5 to 50 mass %, preferably 10 to 45 mass %.

After the activation treatment with the aqueous alkaline solution, the resulting alloy powder may be washed with water. To reduce the residual impurities on the surface of the alloy powder, it is preferable that water washing is finished after the pH of the water used for washing becomes 9 or less.

Usually, the alloy powder having undergone the activation treatment is dried.

(Nickel-Metal Hydride Storage Battery)

A nickel-metal hydride storage battery includes a positive electrode, a negative electrode, a separator interposed between the positive electrode and the negative electrode, and an alkaline electrolyte.

The negative electrode includes the above-described electrode alloy powder as a negative electrode active material.

Figure 1:
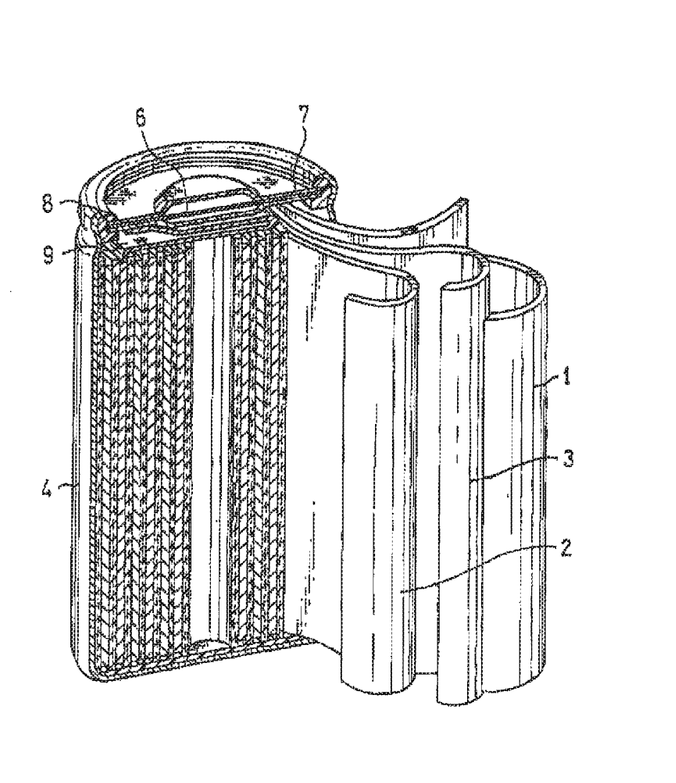
FIG. 1 is a vertical cross-sectional view schematically showing a structure of a nickel-metal hydride storage battery according to an embodiment of the present invention.

A configuration of the nickel-metal hydride storage battery will be described below with reference to FIG. 1. FIG. 1 is a vertical cross-sectional view schematically showing a structure of a nickel-metal hydride storage battery according to an embodiment of the present invention. The nickel-metal hydride storage battery includes a bottomed cylindrical battery case 4 also serving as a negative electrode terminal, an electrode group accommodated in the battery case 4, and an alkaline electrolyte (not shown). In the electrode group, a negative electrode 1, a positive electrode 2, and a separator 3 interposed therebetween are spirally wound. In an opening of the battery case 4, a sealing plate 7 including a safety valve 6 is disposed via an insulating gasket 8, and the end of the opening of the battery case 4 is crimped inwardly, thereby sealing the nickel-metal hydride storage battery. The sealing plate 7, which also serves as a positive electrode terminal, is electrically connected to the positive electrode 2 via a positive electrode lead 9.

Such a nickel-metal hydride storage battery can be obtained by accommodating the electrode group in the battery case 4, injecting the alkaline electrolyte thereinto, placing the sealing plate 7 in the opening of the battery case 4 via the insulating gasket 8, and crimping the end of the opening of the battery case 4 so as to provide sealing. At this time, the negative electrode 1 of the electrode group and the battery case 4 are electrically connected via a negative electrode current collector plate disposed between the electrode group and the inner bottom surface of the battery case 4. In addition, the positive electrode 2 of the electrode group and the sealing plate 7 are electrically connected via the positive electrode lead 9.

In the following, the constituent elements of the nickel-metal hydride storage battery will be described more specifically.

(Negative Electrode)

The negative electrode is not particularly limited so long as it includes the above-described electrode alloy powder as the negative electrode active material, and known materials for use in nickel-metal hydride storage batteries can be used as the other constituent elements.

The negative electrode may include a core member and a negative electrode active material adhering to the core member. Such a negative electrode can be formed by depositing a negative electrode paste containing at least the negative electrode active material on the core member.

Known materials can be used as the core member of the negative electrode, and examples thereof include a porous or non-porous substrate formed of stainless steel, nickel or an alloy thereof, or the like. When the core member is a porous substrate, the active material may be filled into the pores of the core member.

Usually, the negative electrode paste contains a dispersing medium, and known components used for the negative electrode, including, for example, a conductive agent, a binder, and a thickener may be added as necessary.

The negative electrode can be formed by, for example, applying the negative electrode paste onto the core member, subsequently removing the dispersing medium by drying, and rolling the core member.

As the dispersing medium, it is possible to use known mediums, including, for example, water, an organic medium, and a mixed medium thereof.

The conductive agent is not particularly limited so long as it is a material having electronic conductivity. Examples thereof include graphite such as natural graphite (e.g., flake graphite), artificial graphite, and expanded graphite; carbon black such as acetylene black and ketjen black; conductive fiber such as carbon fiber and metal fiber; metal particles such as copper powder; and organic conductive materials such as polyphenylene derivatives. These conductive agents may be used alone or in a combination of two or more. Among these, artificial graphite, ketjen black, carbon fiber, and the like are preferable.

The amount of the conductive agent is, for example, 0.01 to 50 parts by mass, preferably 0.1 to 30 parts by mass, further preferably 0.1 to 10 parts by mass, per 100 parts by mass of the electrode alloy powder.

The conductive agent may be added to the negative electrode paste, and be used as a mixture with another component. Alternatively, the conductive agent may be coated onto the surface of the electrode alloy powder in advance. The conductive agent may be coated by a known method, including, for example, a method in which the conductive agent is dispersed over the surface of the electrode alloy powder, a method in which a liquid dispersion containing the conductive agent is deposited on the surface of the electrode alloy powder, and dried, or a method in which the conductive agent is mechanically coated onto the surface of the electrode alloy powder by a mechanochemical process or the like.

Examples of the binder include resin materials, including, for example, rubbery materials such as a styrene-butadiene copolymer rubber (SBR); polyolefin resins such as polyethylene and polypropylene; fluorocarbon resins such as polytetrafluoroethylene, polyvinylidene fluoride, a tetrafluoroethylene-hexafluoropropylene copolymer, and a tetrafluoroethylene-perfluoroalkylvinylether copolymer; acrylic resins such as an ethylene-acrylic acid copolymer, an ethylene-methacrylic acid copolymer, and an ethylene-methyl acrylate copolymer, and Na ion crosslinked bodies thereof. These binders may be used alone or in a combination of two or more.

The amount of the binder is, for example, 0.01 to 10 parts by mass, preferably 0.05 to 5 parts by mass, per 100 parts by mass of the electrode alloy powder.

Examples of the thickener include cellulose derivatives such as carboxymethyl cellulose (CMC), modified products thereof (including, salts such as Na salts), and methyl cellulose; saponified products of polymers having vinyl acetate units, such as polyvinyl alcohol; and polyalkylene oxides such as polyethylene oxide. These thickeners may be used alone or in a combination of two or more.

The amount of the thickener is, for example, 0.01 to 10 parts by mass, preferably 0.05 to 5 parts by mass, per 100 parts by mass of the electrode alloy powder.

(Positive Electrode)

The positive electrode may include a core member and an active material or an active material layer adhering thereto. Alternatively, the positive electrode may be an electrode obtained by sintering an active material powder.

The positive electrode can be formed by, for example, depositing a positive electrode paste containing at least a positive electrode active material on the core member. More specifically, the positive electrode can be formed by applying the positive electrode paste onto the core member, subsequently removing the dispersing medium by drying, and rolling the core member.

A known material can be used as the core member of the positive electrode, and examples thereof include a porous substrate formed of nickel or a nickel alloy, such as a nickel foam or a sintered nickel plate.

As the positive electrode active material, it is possible to use, for example, nickel compounds such as nickel hydroxide and nickel oxyhydroxide.

Usually, the positive electrode paste contains a dispersing medium, and known components used for the positive electrode, including, for example, a conductive agent, a binder, and a thickener may be added as necessary. The dispersing medium, the conductive agent, the binder, the thickener, and the amounts thereof can be selected from the same materials and the same ranges as those in the case of the negative electrode paste. As the conductive agent, electrically conductive cobalt oxides such as cobalt hydroxide and γ-type cobalt oxyhydroxide may be used. In addition, the positive electrode paste may contain, as an additive, a metal compound (e.g., an oxide, a hydroxide) such as zinc oxide and zinc hydroxide.

(Separator)

As the separator, it is possible to use known separators for use in the nickel-metal hydride storage battery, including, for example, a microporous film, a non-woven fabric, and a laminate thereof. Examples of the materials of the microporous film and the non-woven fabric include polyolefin resins such as polyethylene and polypropylene; fluorocarbon resins; and polyamide resins. In terms of high degradation resistance to the alkaline electrolyte, it is preferable to use a separator made of a polyolefin resin.

It is preferable that a hydrophilic group is incorporated in a separator formed of a material having high hydrophobicity, such as a polyolefin resin, by hydrophilization treatment. Examples of the hydrophilization treatment include corona discharge treatment, plasma treatment, and sulfonation treatment. The separator may be a separator that has been subjected to one of these hydrophilization treatments, or a separator that has been subjected to a combination of two or more of them. For example, it is possible to use a separator that has been subjected to both corona discharge treatment and sulfonation treatment. It is preferable that the separator has been subjected to at least sulfonation treatment. Since a sulfonic acid group is introduced in the separator by sulfonation treatment, the separator that has been subjected to sulfonation treatment has a sulfonic acid group.

The thickness of the separator can be selected from, for example, the range of 10 to 300 μm, and may be 15 to 200 μm, for example. When the separator is a microporous film, the thickness of the separator is, for example, 10 to 100 μm, preferably 10 to 50 μm, further preferably 15 to 40 μm. When the separator has the structure of a non-woven fabric, the thickness of the separator is, for example, 50 to 300 μm, preferably 70 to 200 μm, further preferably 80 to 150 μm.

Preferably, the separator has the structure of a non-woven fabric. Examples of the separator having the structure of a non-woven fabric include a non-woven fabric and a laminate of a non-woven fabric and a microporous film. The weight per unit area of the separator having the structure of a non-woven fabric is, for example, 35 to 70 $g/m^2$, preferably 40 to 65 $g/m^2$, further preferably 45 to 55 $g/m^2$.

(Alkaline Electrolyte)

For example, an aqueous solution containing an alkali (alkaline solute) can be used as the alkaline electrolyte. Examples of the alkali include alkali metal hydroxides such as lithium hydroxide, potassium hydroxide, and sodium hydroxide. These may be used alone or in a combination of two or more.

From the viewpoint of ease of suppression of self-discharge by inhibiting the self-decomposition of the positive electrode active material, the alkaline electrolyte preferably contains at least sodium hydroxide as the alkali. The alkaline electrolyte may contain sodium hydroxide and at least one selected from the group consisting of potassium hydroxide and lithium hydroxide.

The sodium hydroxide concentration in the alkaline electrolyte is, for example, 5 to 40 mass %, preferably 9.5 to 35 mass %, or 9.7 to 33 mass % or more. When the sodium hydroxide concentration is within this range, the self-discharge characteristics can be further improved.

When the alkaline electrolyte contains potassium hydroxide, the ionic conductance of the electrolyte can be easily increased, which facilitates an increase in the output. The potassium hydroxide concentration in the alkaline electrolyte can be selected from, for example, the range of 0 to 45 mass %, and may be 0.05 to 41 mass % or 0.1 to 33 mass %. When the alkaline electrolyte contains potassium hydroxide, the potassium hydroxide concentration in the alkaline electrolyte may be higher than the sodium hydroxide concentration. However, from the viewpoint of effectively suppressing self-discharge, may be smaller than the sodium hydroxide concentration.

When the alkaline electrolyte contains lithium hydroxide, the oxygen overvoltage can be easily increased. When the alkaline electrolyte contains lithium hydroxide, the lithium hydroxide concentration in the alkaline electrolyte can be appropriately selected from, for example, the range of 0 to 5 mass %, and may be 0.1 to 3 mass %, or 0.1 to 1 mass %, from the viewpoint of ensuring the high ion conductivity of the alkaline electrolyte.

Note that the specific gravity of the alkaline electrolyte is, for example, 1.03 to 1.55, preferably 1.11 to 1.32.

EXAMPLES

Hereinafter, the present invention will be specifically described by way of examples and comparative examples. However, the present invention is not limited to the following examples.

Example 1

(1) Production of First Hydrogen Storage Alloy Particles

Simple substances of La, Ce, Mg, Ni, Co, Mn, and Al were mixed at such a ratio that the resulting hydrogen storage alloy had a composition $La_{0.66}Ce_{0.27}Mg_{0.07}Ni_{4.00}Co_{0.30}Mn_{0.40}Al_{0.30}$, and the mixture was molten in a high frequency induction furnace. The molten metal was poured (supplied) into a mold at a rate of 2 m/min, to produce an ingot. The obtained ingot was heated at 1060° C. for 10 hours under an argon atmosphere. The heated ingot was ground into coarse particles. The obtained coarse particles were ground with a wet ball mill in the presence of water, and the wet coarse particles were sifted through a sieve with a mesh size of 75 µm, to give a starting powder containing a hydrogen storage alloy and having an average particle size of 20 µm.

The obtained starting powder was mixed with an aqueous alkaline solution containing sodium hydroxide at a concentration of 40 mass % and having a temperature of 100° C., and the mixture was kept stirred for 50 minutes. The resulting powder was collected, washed with warm water, and dehydrated, followed by drying. Washing was performed until the pH of the warm water after use became 9 or less. As a result, first hydrogen storage alloy particles from which impurities had been removed were obtained.

(2) Production of Second Hydrogen Storage Alloy Particles

A starting powder was produced in the same manner as in the step described in (1) above except that simple substances of Zr, Ti, Ni, Mn, and Al were mixed at such a ratio that the resulting hydrogen storage alloy had a composition $Zr_{0.9}Ti_{0.1}Ni_{1.2}Mn_{0.6}Al_{0.2}$ and that heating of the ingot was performed at a temperature of 850° C. for 6 hours, to produce particles (average particle size: 20 µm) of a second hydrogen storage alloy having an $AB_2$-type crystal structure.

(3) Production of Negative Electrode

An electrode alloy powder was prepared by uniformly mixing the first hydrogen storage alloy particles obtained in the step described in (1) above and the second hydrogen storage alloy particles obtained in the step described in (2) above at a mass ratio of 75:25.

An electrode paste was prepared by adding 0.15 parts by mass of CMC (degree of etherification: 0.7, degree of polymerization: 1600), 0.3 parts by mass of acetylene black, and 0.7 parts by mass of SBR, per 100 parts by mass of the electrode alloy powder, further adding water thereto, and kneading the mixture. The obtained electrode paste was applied onto both sides of a core member made of a nickel-plated iron punched metal (thickness: 60 µm, pore diameter: 1 mm, porosity: 42%). The coating of the paste was dried, and subsequently pressed together with the core member by a roller. Thus, a negative electrode having a thickness of 0.4 mm, a width of 35 mm, and a capacity of 2200 mAh was obtained. An exposed portion of the core member was provided at one end of the negative electrode along the longitudinal direction.

(4) Production of Positive Electrode

A sintered-type positive electrode having a capacity of 1500 mAh was provided by filling nickel hydroxide into a positive electrode core member constituted by a porous sintered substrate. About 90 parts by mass of $Ni(OH)_2$ was used as a positive electrode active material, to which about 6 parts by mass of $Zn(OH)_2$ was added as an additive, and about 4 parts by mass of $Co(OH)_2$ was added thereto as a conductive material. An exposed portion of the core member where no active material was retained was provided at one end of the positive electrode core member along the longitudinal direction.

(5) Production of Nickel-Metal Hydride Storage Battery

Using the negative electrode and the positive electrode obtained as above, a nickel-metal hydride storage battery having a nominal capacity of 1500 mAh and having a 4/5 A size as shown in FIG. 1 was produced. Specifically, the positive electrode 1 and the negative electrode 2 were wound with the separator 3 disposed therebetween, to produce a columnar electrode plate group. In the electrode plate group, the core member exposed portion of the positive electrode where no positive electrode material mixture was deposited and the core member exposed portion of the negative electrode where no negative electrode material mixture was deposited were exposed on opposing end faces. As the separator 3, a polypropylene non-woven fabric (thickness: 100 µm, weight per unit area: 50 g/cm²) that had been subjected to sulfonation treatment was used.

A positive electrode current collector plate was welded to the end face of the electrode plate group where the positive electrode core member was exposed. A negative electrode current collector plate was welded to the end face of the electrode plate group where the negative electrode core member was exposed. The sealing plate 7 and the positive electrode current collector plate were electrically connected via the positive electrode lead 9. Subsequently, the electrode plate group was accommodated in the battery case 4 constituted by a bottomed cylindrical can, with the negative electrode current collector plate facing downward. The negative electrode lead connected to the negative electrode current collector plate was welded to the bottom of the battery case 4. After an electrolyte was injected into the battery case 4, the opening of the battery case 4 was sealed by the sealing plate 7 including the gasket 8 at its periphery. Thus, a nickel-metal hydride storage battery (battery A1) was produced.

Note that, as the electrolyte, an aqueous alkaline solution (specific gravity: 1.23) containing 31 mass % of sodium hydroxide, 1 mass % of potassium hydroxide, and 0.5 mass % of lithium hydroxide as alkalis was used.

(6) Evaluation

The hydrogen storage alloy particles and the nickel-metal hydride storage battery obtained as above were evaluated as follows.

(a) Self-Discharge

The nickel-metal hydride storage battery was charged in an environment at 25° C. at a 10 hour rate (150 mA) for 15 hours, and discharged at a 5 hour rate (300 mA) until the battery voltage reached 1.0 V. The discharge capacity at this time was determined, and used as the initial capacity.

The nickel-metal hydride storage battery whose initial capacity had been measured was charged in an environment at 25° C. at a 10 hour rate (150 mA) for 15 hours, and stood still at 45° C. for 90 days. The battery that had been stood still was discharged at a 5 hour rate (300 mA) until the battery voltage reached 1.0 V. The discharge capacity at this time was determined, and the rate of this capacity to the initial capacity was determined in percentage as the capacity retention rate. A value obtained by subtracting the capacity retention rate from 100% was used as a self-discharge rate for evaluation.

(b) Single Electrode Capacity

Using the hydrogen storage alloy particles obtained in the examples and comparative examples, negative electrodes having a design capacity of 1000 mAh were produced according to the step described in (3) above. Except for using the obtained negative electrodes, negative electrode-limited nickel-metal hydride batteries were produced in the same manner as in (5) above. Each of the obtained batteries was charged in an environment at 25° C. at a 10 hour rate (100 mA) for 12 hours, and discharged at a constant current (100 mA) until the potential of the negative electrode relative to the mercury reference potential reached −0.5 V, while the negative electrode potential was being measured with a Hg/HgO reference electrode. The duration was determined, and the single electrode capacity of the negative electrode per weight of the hydrogen storage alloy was calculated.

Examples 2 to 6 and Comparative Examples 1 to 4

Nickel-metal hydride storage batteries A2 to A6 and B1 to B4 were produced and evaluated in the same manner as in Example 1 except that the amount (mass %) of the first hydrogen storage alloy particles contained in the electrode alloy powder was varied as shown in Table 1.

Example 7 and Comparative Example 5

Nickel-metal hydride storage batteries A7 and B5 were produced and evaluated in the same manner as in Example 1 and Comparative Example 1, respectively, except that second hydrogen storage alloy particles having an $AB_3$-type crystal structure were used as the second hydrogen storage alloy particles.

As the second hydrogen storage alloy particles having an $AB_3$-type crystal structure, second hydrogen storage alloy particles (average particle size: 20 μm) were used that had been produced by producing a starting powder in the same manner as in the step described in (1) of Example 1 except that simple substances of Zr, La, Y, Mg, Ni, Al, Co, and Ge were mixed at such a ratio that the resulting hydrogen storage alloy had a composition $Zr_{0.05}La_{0.93}Y_{0.01}Mg_{0.01}Ni_{2.75}Al_{0.03}Co_{0.30}Ge_{0.01}$.

The results for Examples 1 to 7 and Comparative Examples 1 to 5 are shown in Table 1. Note that the batteries A1 to A7 correspond to the examples, and the batteries B1 to B5 correspond to the comparative examples.

TABLE 1

| Battery | Hydrogen storage alloy First (mass %) | Second | Single electrode capacity of negative electrode mAh/g | Self-discharge rate % |
|---|---|---|---|---|
| B1 | 0 | $AB_2$ | 377.0 | 27.0 |
| B2 | 30 | $AB_2$ | 350.9 | 26.4 |
| B3 | 50 | $AB_2$ | 333.5 | 25.2 |
| A2 | 55 | $AB_2$ | 329.2 | 23.6 |
| A3 | 60 | $AB_2$ | 324.8 | 22.7 |
| A1 | 75 | $AB_2$ | 311.8 | 20.8 |
| A4 | 85 | $AB_2$ | 303.1 | 22.1 |
| A5 | 90 | $AB_2$ | 298.7 | 23.6 |
| A6 | 95 | $AB_2$ | 294.4 | 24.7 |
| B4 | 100 | — | 290.0 | 27.9 |
| A7 | 75 | $AB_3$ | 300.9 | 21.2 |
| B5 | 0 | $AB_3$ | 333.5 | 26.5 |

As shown in Table 1, the batteries of the examples had a higher single electrode capacity of the negative electrode and a lower self-discharge rate as compared with B4, for which only the first hydrogen storage alloy particles were used. The examples also had a higher battery capacity because of the higher single electrode capacity of the negative electrode. B1 and B5, for which only the second hydrogen storage alloy particles were used, had a high single electrode capacity of the negative electrode, but they also had a high self-discharge rate.

The batteries B2 and B3 of the comparative examples, in which the amount of the first hydrogen storage alloy particles was 50 mass % or less, also had a high self-discharge rate. It is considered that these batteries contained a relatively large amount of the second hydrogen storage alloy, and thus, the amount of metals eluted from the second hydrogen storage alloy was excessively large, making it impossible to suppress the metal precipitation and hence a micro-short circuit.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the embodiment of the present invention, it is possible to obtain an electrode alloy powder that can increase the capacity of a nickel-metal hydride storage battery and suppress self-discharge. Accordingly, the present invention is expected to be used as an alternative to a dry battery and also as a power source for various devices, and is also expected to be used in applications such as a power source for hybrid vehicles.

REFERENCE SIGNS LIST

1. . . . Negative electrode
2. . . . Positive electrode
3. . . . Separator
4. . . . Battery case
6. . . . Safety valve
7. . . . Sealing plate
8. . . . Insulating gasket
9. . . . Positive electrode lead

The invention claimed is:
1. An electrode alloy powder comprising:
a mixture including particles of a first hydrogen storage alloy having an $AB_5$-type crystal structure, and particles of a second hydrogen storage alloy b having an $AB_3$-type crystal structure, wherein:
an amount of the first hydrogen storage alloy included in the mixture is greater than 50 mass %,
the first hydrogen storage alloy includes (1a) an element $L^1$, an element $M^1$, and Ni, or (1b) an element $L^1$, an element $M^1$, Ni, and an element $E^1$,
element $L^1$ is at least one selected from the group consisting of Group 3 elements and Group 4 elements of the periodic table,
element $M^1$ is at least one selected from the group consisting of Mg, Ca, Sr, and Ba,
element $E^1$ is at least one selected from the group consisting of V, Nb, Ta, Cr, Mo, W, Mn, Fe, Co, Cu, Ag, Zn, Al, Ga, In, Si, Ge, Sn, and P, and
a sum of a molar ratio $x^1$ of Ni and a molar ratio $z^1$ of element $E^1$ respectively to a sum of element $L^1$ and element $M^1$ satisfies $4.5 \leq x^1 + z^1 \leq 5.5$,
the second hydrogen storage alloy b includes (2a) an element $L^3$, an element $M^2$, and Ni, or (2b) an element $L^3$, an element $M^2$, Ni and an element $E^3$, element $L^3$ is at least one selected from the group consisting of Group 3 elements and Group 4 elements of the periodic table, element $M^2$ is at least one selected from the group consisting of Mg, Ca, Sr, and Ba, element $E^3$ is at least one selected from the group consisting of V, Nb, Ta, Cr, Mo, W, Mn, Fe, Co, Cu, Ag, Zn, B, Al, Ga, In, Si, N, P, and S, and a sum of a molar ratio $x^3$ of Ni and a molar ratio $z^3$ of element $E^3$ respectively to a sum of element $L^3$ and element $M^2$ satisfies $2.5<x^3+z^3<4.5$.

2. The electrode alloy powder in accordance with claim 1, wherein an amount of the first hydrogen storage alloy included in the mixture is 60 to 95 mass %.

3. The electrode alloy powder in accordance with claim 1, wherein:

an average particle size $D_1$ of the particles of the first hydrogen storage alloy is 20 μm to 60 μm, and an average particle size $D_2$ of the particles of the second hydrogen storage alloy b is 15 μm to 50 μm.

4. The electrode alloy powder in accordance with claim 1, wherein:

element $E^3$ includes at least Al, element $L^3$ includes at least one selected from the group consisting of Y and lanthanoid elements, and element $M^2$ includes at least Mg.

5. The electrode alloy powder in accordance with claim 1, wherein element $L^3$ includes at least Y.

6. The electrode alloy powder in accordance with claim 1, wherein:

the mixture further includes particles of a hydrogen storage alloy a having an $AB_2$-type crystal structure, the hydrogen storage alloy a includes an element $L^2$, Ni, and an element $E^2$, element $L^2$ is a Group 4 element of the periodic table and includes at least one selected from the group consisting of Ti and Zr, element $E^2$ is at least one selected from the group consisting of Group 5 to Group 11 transition metal elements excluding Ni, Group 12 elements, Group 13 elements in the second period to the fifth period, Group 14 elements in the third period to the fifth period of the periodic table, and P, and a sum of a molar ratio $x^2$ of Ni and a molar ratio $z^2$ of element $E^2$ respectively to element $L^2$ satisfies $1.5 \leq x^2 + z^2 \leq 2.5$.

7. A negative electrode for nickel-metal hydride storage batteries, comprising the electrode alloy powder in accordance with claim 1 as a negative electrode active material.

8. A nickel-metal hydride storage battery comprising:

a positive electrode; the negative electrode in accordance with claim 7; a separator interposed between the positive electrode and the negative electrode; and an alkaline electrolyte.

* * * * *